July 23, 1968 R. H. DYE 3,394,366
DATA DISPLAY SYSTEM
Filed April 8, 1965
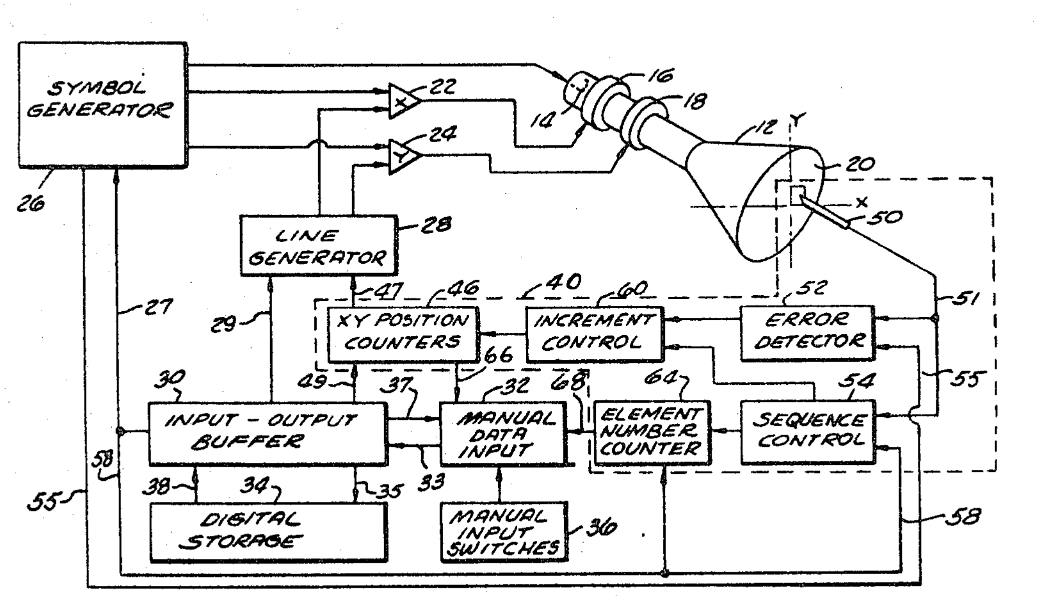
FIG. 1
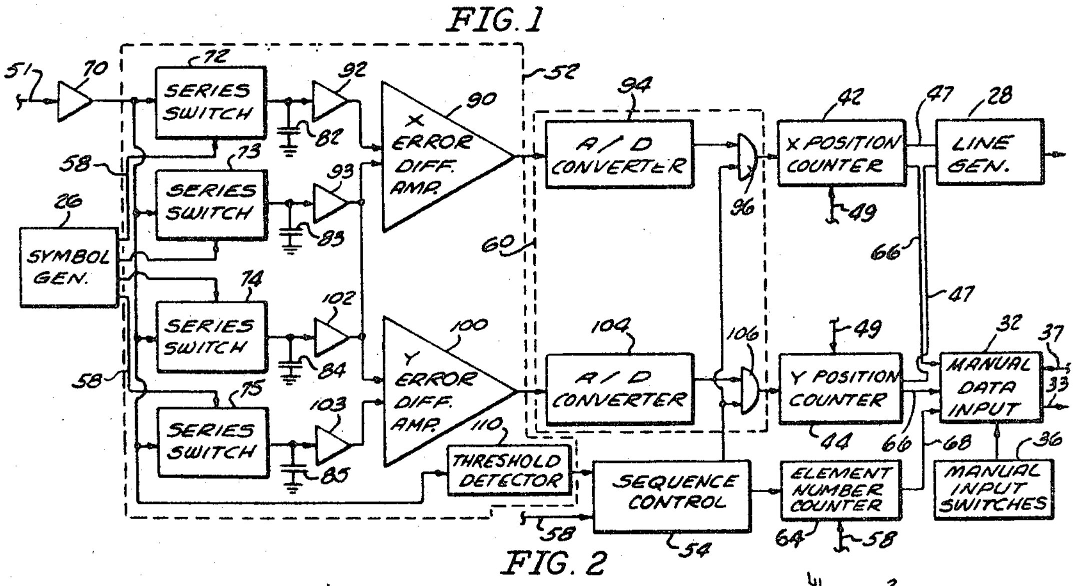
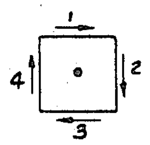
FIG. 3A
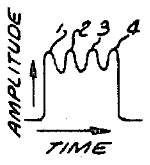
FIG. 3B
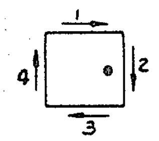
FIG. 4A
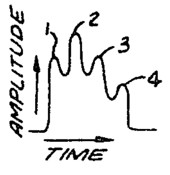
FIG. 4B
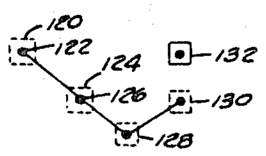
FIG. 5
INVENTOR
ROBERT H. DYE
BY
ATTORNEYS United States Patent Office 3,394,366

Patented July 23, 1968

3,394,366

DATA DISPLAY SYSTEM

Robert H. Dye, Ann Arbor, Mich., assignor to The Bendix Corporation, Ann Arbor, Mich., a corporation of Delaware Filed Apr. 8, 1965, Ser. No. 446,525
8 Claims. (Cl. 340—324)

ABSTRACT OF THE DISCLOSURE

An apparatus for moving a square cursor symbol generated by four sequential strokes across a cathode ray tube screen in response to movement of a photocell positioned adjacent to the symbol. The photocell provides an output having four time-separated components corresponding to each of the strokes which is applied to a differential amplifier. The differential amplifier provides a signal representative of the relative magnitudes of the opposite components, which in turn represents the orthogonal displacements of the photocell with respect to the cursor symbol. This relative displacement signal may then be used to reposition the cursor symbol in the direction of the photocell.

This invention relates to a data display system where a displayed item can be manually selected with a light detector and then repositioned on the display by manually moving the dectector across the display to the desired position.

One type of high speed digital computer includes a cathode ray tube display operated under command of a computer. Normally the computer is operated cyclically to repeatedly perform operations on incoming data according to the computer program. To enable the operator to alter the computer program in connection with the display, the operating cycle of the display is divided between command data input and display data output. During the data output portion of the cycle instructions are read from computer storage and used to generate a display frame on the cathode ray tube. The display frame is composed of symbols whose type and location on the display are derived from computer storage in digital form. A digital buffer reads instructions for each symbol, including both symbol type and symbol location instructions. The buffer then transfers the instructions to appropriate apparatus which generates the specified symbol at a specified location on the cathode ray tube. Instructions for each symbol are transferred successively in time sequence by the buffer and the symbols are displayed individually in accordance with that sequence to make up a complete display frame. During the command input portion of the cycle the computer senses instructions which are under the control of the operator. By means of manual switches an operator can send specific requests to the computer for action to be taken concerning an item or location specified on the display. An item or a location may be identified to the computer by means of a light detector which the operator plates over that item on the display. The buffer then proceeds with the next data display frame.

One type of computer operated display uses a conventional cathode ray tube and deflects the electron beam with a line generator and a stroke-type symbol generator. The line generator determines a particular display location for the beam and then the symbol generator deflects the beam about that location to generate a particular symbol on the display. Individual symbols are written successively in time sequence to generate a complete display frame. When a particular symbol is specified by the operator for further action to the computer, digital information used to generate the display is noted, and used to designate that the particular symbol location or symbol type to the computer. In addition to element designation, the operator can alter the display by repositioning the symbols on the display in connection with requests that are sent to the computer. One such data display system is disclosed in a United States patent application, Ser. No. 446,590, filed together with the present application in the name of Ernest S. Van Valkenburg, entitled, "Data Display System," and assigned to the assignee of the present application.

In general the device disclosed in the Van Valkenburg application incorporates a manually movable light detector which an operator can place over a symbol being displayed. As the operator moves the light detector across the display, displacement errors between the location of the detector and the symbol specified are sensed to provide a displacement error signal. At the time each symbol is displayed, its digital location is readily available. The displacement error signal may then be used to increment the digital location for the symbol selected, either directly or after temporary storage, to coincide with the position of the light detector. The incremented or corrected digital location is used to reposition the symbol on the next display frame at the new location. In one embodiment disclosed in the Van Valkenburg application, a lateral effect photocell, hereinafter called a lateral photocell, is used as a light detector. The lateral photocell directly provides a pair of displacement error signals resolved along orthogonal axes of the photocell which are oriented by the operator along orthogonal deflection axes of the cathode ray tube.

In addition to providing direct manual control of the position of a symbol, the light detector is also capable of sketching or writing electronically on the display since a symbol selected by the operator can be made to follow the light detector as it is moved across the display. If the symbol location data is sampled and stored as the symbol is moved, the sampled location data can be used to generate a record of the past motion of the light detector on the display. For example, the motion of the light detector can be displayed as a continuous line or a series of dots. With the lateral photocell disclosed in the aforementioned Van Valkenburg application, the axes of the detector are used as a reference for the displacement error. Thus the detector must be aligned properly with respect to the deflection axes of the code ray tube. Accidental rotation of the light pencil generates erroneous displacement error signals and the symbol will not accurately follow the motion of the light detector. Stated differently error signals produced by a lateral photocell are referenced to a coordinate system based on the geometry of the photocell, while corrections for the error are made with respect to the coordinate system of the display. Rotation or roll of the light detector introduces a coordinate transformation error in the position error. If uncorrected by the operator, the correction path of the symbol will be a spiral rather than a straight line. Even for a small rotation (for example, an angle of 30°) the probability of losing the symbol when the light detector is in motion is increased substantially since the symbol will take a significantly different path from that of the light detector. This does not present a serious problem where the light detector is used to merely reposition the symbol on the display since the operator can reorient the light detector to bring the symbol in line with the detector. However where the light detector is used for writing by displaying the past motion of the light detector, correction for rotation of the light detector would be interpreted as a writing motion and would be reproduced on the display.

An object of the present invention is to write electronically on a data display by means of a method and apparatus that detect displacement errors related directly to the display and thus do not require critical orientation of the light detector relative to the display.

Further objects of the present invention include detecting disyplacement errors between a manually movable light detector and displayed symbols of specific types of a method and apparatus that operate rapidly, and effectively; that are simple to use and do not require critical orientation of the light detector relative to the display; and that are especially adapted for use in repositioning the symbol on a display.

In general this invention contemplates using particular symbol types which have a unique configuration relative to the deflection axes of the display. The symbol, called a cursor, is generated by a stroke-type symbol generator at a known position in the time sequence of the display. The output from a light detector placed over the cursor type symbol is sampled in time coincidence with the generation of the strokes of the symbol. By comparing the sampled output for predetermined strokes related to the axis of the display, the displacement between the cursor and the pencil can be sensed to provide a correction signal. The correction signal is used to vary the digital location data of the cursor to display the symbol at the last known position of the light detector during subsequent display frames. Any photoelectric detector having appropriate sensitivity and response can be used to measure the light from an individual symbol as that symbol is displayed. In accordance with one embodiment of the present invention, a square symbol is used as the cursor to trace the path of the light detector. The square-shaped cursor serves as a source of four distinct light sources distributed symmetrically about the centroid of the square. Since the cursor is generated by the symbol generator in sequential strokes, the four sides of the square correspond to four definite time intervals in a symbol generation period. A single photocell provides a four channel, time-multiplexed signal which is sampled during each stroke of the square to resolve the total signal into four component signals. The amplitude of each component signal is related to the displacement between the centroid of photocell and a respective side of the square symbol. The component signals are then compared to obtain a pair of correction signals which are used to vary the digital location of the square in such a direction as to reduce the displacement error.

Other objects, features and advantages of this invention will become apparent from a consideration of the following description, the appended claims and the accompanying drawing in which:

FIGURE 1 is a simplified block diagram of a data display system which includes a symbol positioning system constructed in accordane with the present invention for moving the cursor symbol in accordane with the position of a manually movable light detector and for displaying the past motion of the light detector in accordance with previous positions of the symbol;

FIGURE 2 is a detailed block diagram of a portion of the system shown in FIG. 1 for repositioning a square symbol and illustrates an error detector which is constructed in accordance with one aspect of the present invention to detect displacements between the square symbol and the light detector;

FIGURES 3A and 3B illustrate a square symbol and the output of the light detector when the detector is disposed over the center of the symbol;

FIGURES 4A and 4B are views corresponding to FIGS. 3A, 3B where the light detector is disposed horizontally from the center of the square symbol; and FIGURE 5 is a schematic diagram illustrating a writing display which may be produced in accordance with the motion of the square symbol as the symbol follows the light detector.

Referring to FIG. 1, a data display system which resembles in certain respects the system disclosed in the Van Valkenburg application, is shown to illustrate displacement error detection and electronic writing in accordance with the present invention. A generally conventional cathode ray tube 12 comprises an electron gun 14 which produces a concentrated electron beam. The beam is projected between a pair of deflection coils 16, 18 that deflect the beam horizontally and vertically along orthogonal axes of tube 12, referred to hereinafter as the X and Y deflection axes, respectively. The electron beam impinges on a screen 20 which is coated with luminescent material to provide a luminous visual display. Coil 16 is energized by analog signals from a deflection amplifier 22 to deflect the electron beam horizontally along the X axis. Similarly coil 18 is energized by analog signals from a deflection amplifier 24 to deflect the electron beam vertically along the Y axis. Each of the amplifiers 22, 24 are in turn energized by analog signals from a symbol generator 26 and a digital to analog converter or line generator 28. In general the signals from line generator 28 are analog representations of a discrete spot or location on screen 20 whereas the signals from generator 26 are analog signals for generating a particular symbol at the location specified by line generator 28. Intensity signals from symbol generator 26 are also connected to gun 14 to energize the beam during a symbol display and blank the beam between symbol displays. The signals from generator 26 deflect the beam in sequential strokes, either straight line or curved line strokes, to display a particular symbol. Symbol generator 26 and line generator 28 are each connected to an input-output buffer 30 by lines 27, 29, respectively. For the display of each symbol, buffer 30 simultaneously transmits location instructions, in digital form, to line generator 28 via line 29 and symbol type instructions, also in digital form, to symbol generator 26 via line 27.

Buffer 30 is arranged to operate in cycles with each cycle divided into an input portion and a data output or data display portion. During the data input portion of the cycle instructions can be transferred from a manual data input 32 (via a line 33) to a digital storage 34 (via a line 35) on command (via a line 37) from buffer 30. Data is supplied to the manual data input 32 by means of manual input switches 36 which are under manual control of the operator. During the output or display portion of the cycle buffer 30 reads instructions for each symbol to be displayed from storage 34 (via a line 38) and then successively in time sequence transfers the instructions for each symbol to line generator 28 and symbol generator 26. As used in this application, the term "time sequence" denotes the manner in which a display of symbols is generated. In a time sequence display a particular symbol is generated only for a predetermined time during each display cycle or frame. Thus during each frame each symbol has an individual position in the time sequence of the display. The time sequence in a display need not be related to any regular position sequence on the display. In general the display system described above is similar to that used in computer operated displays. In such a system, storage 34 would be under the control of a computer (not shown) for processing incoming data in accordance with the computer program.

In accordance with one aspect of the present invention the first symbol generated during the display portion of the operating cycle of buffer 30 is a particular symbol called a cursor. By way of example a cursor might be a very small square. The particular symbol to be used as the cursor is set by the operator on manual input switches 36 and is transferred to storage 34 via input 32 and buffer 30 during the input portion of the buffer cycle. With the circuit shown in FIG. 1 the cursor is the symbol selected by the operator for repositioning and electronic writing. The cursor position is under manual control of the operator by means of a light pencil system outlined in dashed lines in FIG. 1 and designated by numeral 40. The light pencil system 40 can also be used to select the cursor symbol type.

The light pencil system 40 generally comprises an X position counter 42 (FIG. 2) and a Y position counter 44 (FIG. 2) designated collectively as XY position counters 46 in FIG. 1. Counters 46 contain the X and Y digital locations for the cursor. At the beginning of each display portion of the buffer cycle the cursor symbol type is transmitted to symbol generator 26 from storage 34 by buffer 30. The cursor location is transferred to line generator 28 from counter 46 (via a line 47) on command (via a line 49) from buffer 30. The light pencil system 40 also comprises a light detector in the form of a light pencil 50 which can be held by the operator and moved over the display on screen 20 of the cathode ray tube 12. Pencil 50 is constructed with a relatively small field of view to intercept light from only a single symbol display. Pencil 50 includes a conventional photocell for providing an output signal representing the intensity of the light impinging the photocell symbol display. During the display of an individual symbol, the output from pencil 50 will vary in magnitude depending on the location of each stroke forming the symbol. Although the display appears visually as a continuous display, each symbol in the display is generated separately for a very short duration and therefore the output from pencil 50 is coincident in time with signals from generators 26, 28 generating the symbol then being displayed.

The output signal from pencil 50 is applied (via a line 51) to an error detector 52 and to a sequence control 54. Error detector 52 is also connected to symbol generator 26 by a line 55 to receive sampling signals from generator 26 while the cursor is displayed. Sequence control 54 is also connected to buffer 30 by a line 58 to receive timing signals from buffer 30. The timing signals from buffer 30 are coincident with the generation of each symbol and also identify the cursor symbol in the display sequence, as for example when the cursor is the first symbol generated during each display frame. Error detector 52 has its output connected to an increment control 60. The output from detector 52 is an analog signal representing a displacement error between the location of pencil 50 on the display and on the location of the cursor on the display. Increment control 60 converts the analog displacement error signal from detector 52 to a digital displacement error signal for correcting the digital location in counters 46 in accordance with the direction and magnitude of the error signal. Increment control 60 is also connected to sequence control 54 to receive an enabling signal from the sequence control so that counters 46 are incremented only while the cursor is displayed. The enabling signal from the sequence control 54 is provided upon coincidence of an output from pencil 50 and a timing signal from buffer 30 which in turn is coincident with the display of the cursor symbol. The light pencil system 40 also includes an element number counter 64 which is connected to buffer 30 by line 58 to receive timing pulses coincident with the generation of each symbol. Counter 64 is reset between successive display frames so that the number in counter 64 corresponds to the position of a symbol in the time sequence of each display frame. Element number counter 64 is also connected to the output of sequence control 54 to receive a disabling signal to prevent further incrementing or counting. The disabling signal is produced by sequence control 54 on coincidence of a timing signal from buffer 30 and an output from pencil 50. Counters 46 and counter 64 are also connected to the manual data input 32 by lines 66, 68, respectively, so that the position data in counters 46 and the element number in counter 64 can be transferred to manual data input 32 and thence to storage 34 by buffer 30 during the data input portion of the buffer cycle.

Referring to the constructon and operation of the error detector 52 (FIG. 1) in greater detail, FIG. 2 illustrates one embodiment of the present invention for detecting displacement errors with a square cursor symbol of the type illustrated in FIG. 3A. The output from the photocell in pencil 50 is amplified by a pre-amplifier 70 and applied simultaneously to four series switches 72, 73, 74, 75, each of which samples the output from pencil 50 during a respective stroke of the cursor. Pre-amplifier 70 may be housed in pencil 50. The frequency response of pre-amplifier 70 is chosen to compensate for the time constants of the screen 20 and the photocell. Switches 72–75 are connected to symbol generator 26 (line 58, FIG. 1; lines 58, FIG. 2) to receive a sampling pulse during a respective one of the strokes producing the square cursor. Switches 72, 73 sample the output of pencil 50 during vertical strokes whereas switches 74, 75 sample the output from pencil 50 during horizontal strokes. Each of the switches 72–75 is connected to a respective capacitor 82, 83, 84, 85 which stores the sampled output from pencil 50. Capacitors 82, 83 are connected to a differential amplifier 90 through respective emitter follower amplifiers 92, 93. Amplifier 90 compares the output from switches 72, 73 to determine a displacement between the cursor and the pencil along the X axis of the display. Thus the output from amplifier 90 is an analog error signal representing a displacement along the X axis between the pencil and the cursor. Amplifier 90 is highly nonlinear to compensate for the inverse square law effect governing the amplitude versus distance response of the photocell to light from the sides of the square cursor. Amplifier 90 is connected to an analog to digital converter 94 to provide a digital representation of the X axis displacement. The output from converter 94 is coupled to the X position counter 42 through a gate 96.

Converter 94 may be a binary three bit converter. A large displacement error between pencil 50 and the cursor causes a one to be added to the third least significant bit stored in counter 42; a smaller error adds a one to the second least significant bit, whereas a one is added to the least significant bit to provide fine control depending on the minimum detectible displacement error. The digital location in counter 42 is corrected by either adding or subtracting depending on the direction of the output from converter 94. Where a three bit converter is used the output would then be coupled to counter 42 by three separate gates represented by gate 96 (FIG. 2). Gate 96 is enabled by a signal from sequence control 54 (FIGS. 1 and 2). The output from pencil 50 is also connected to sequence control 54 (FIGS. 1 and 2) through a threshhold detector 110 which indicates whether the light received by the photocell exceeds a threshhold which is in effect at that time. Threshhold 110 is preferably a variable threshhold device which permits the output from pencil 50 to be used for symbol designation as well as repositioning the cursor when pencil 50 is used for electronic writing. A reasonable threshhold for permitting repositioning of the square cursor symbol during electronic writing would not be satisfactory for detecting periods or other small symbols during a symbol designation. The output from threshhold detector 78 is connected to the sequence control 54 (FIGS. 1 and 2).

Similarly the outputs from capacitors 84, 85 are connected to a differential amplifier 100 through respective emitter follower amplifiers 102, 103. The output from amplifier 100 is an analog displacement error signal representing the displacement between pencil 50 and the cursor along the Y axis. Amplifier 100 is connected to an analog to digital converter 104 which provides a digital representation of the displacement error. Converter 104 is in turn connected to the Y position counter 44 by a coincidence gate 106. Gate 106 is also connected to sequence control 54 to receive an enabling signal when counter 44 is to be incremented in accordance with the Y axis error signal.

Each of the X and Y position counters 42, 44 are connected to line generator 28 (FIGS. 1 and 2) by lines 47 for transferring the cursor location to the line generator when the cursor is displayed at the beginning of a frame on command from buffer 30. Counters 42, 44 are also connected to the manual data input 32 (FIGS. 1 and 2) by lines 66 for transferring the cursor location to the manual data input and thence to storage 34.

Initially when a display is generated in accordance with the instructions from buffer 30, the square cursor will be located at some random position depending on the previous digital location in counters 42, 44. At the beginning of each display frame the X and Y position counters 42, 44 on command from buffer 30 deflect the electron beam to a location on the display and the beam is deflected about that location by symbol generator 26 to display the cursor at that location. The square symbol type that is displayed as the cursor is determined by manual input switches 36. When it is desired to reposition the cursor on the display the operator first places pencil 50 against the screen 20 of the cathode ray tube 12 and over the cursor. With pencil 50 disposed over the cursor, each time the cursor is generated light from the cursor strikes the photocell in pencil 50. If the pencil is centered over the cursor, that is, if the centroid of the photocell illustrated as a dot in FIG. 3A is centered relative to the four sides of the cursor, the output from pencil 50 will be of the form illustrated in FIG. 3B. Each of the four maximum points in the wave form shown in FIG. 3B correspond to a respective stroke generating the square symbol designated as strokes 1, 2, 3, 4, in FIG. 3A. Switch 72 is opened by a sampling signal from generator 26 during the vertically downward stroke, stroke 2, while switch 73 is opened during the vertically upward stroke, stroke 4. Switch 74 is opened during the horizontal stroke to the right, stroke 1, and switch 75 is opened during the horizontal stroke to the left, stroke 3. The outputs from switches 72–75 charge capacitors 82–85 to peak and the charge is held temporarily by the capacitors for comparison by amplifiers 90, 100. Thus when the pencil is centered on the square, an equal response is obtained during each of the four strokes and the outputs from amplifiers 90, 100 are zero. If pencil 50 is off center in the X direction, for example to the right as illustrated in FIG. 4A, pulse number 2 in the output of pencil 50 increases while pulse number 4 decreases and pulses 1 and 2 remain unchanged and equal. Thus for the situation illustrated in FIG. 4A the output from amplifier 100 remains at zero whereas the output from the amplifier 90 is an analog signal representing the displacement along the X axis. In a similar manner if pencil 50 is off center in a Y direction the first and third pulses in the output from pencil 50 are modified.

As the operator moves pencil 50 across the display to reposition the cursor, the pencil provides an output each time the cursor symbol is generated which is sampled by switches 72–75 to provide X and Y displacement error signals at the output of amplifiers 90, 100. The analog outputs from amplifiers 90, 100 are converted to digital displacement signals and used to increment the digital location in counters 42, 44 when gates 96, 106 are enabled by pulses from sequence control 54. Each time the cursor is displayed, sequence control 54 receives a timing pulse from buffer 30 via line 58 (FIGS. 1 and 2). On coincidence of an output from pencil 50 and a cursor timing signal from buffer 30, sequence control 54 enables the increment control 60 to correct the digital location in counters 42, 44 to coincide with the position of pencil 50 on the display. At the end of the display frame, the incremented X and Y locations from counters 42, 44 may be read into the manual data input 32. The incremented locations in counters 42, 46 designate the new cursor location to line generator 28 at the beginning of the next display frame.

Thus at the end of each display frame, the incremented location of the cursor is available for storage in the digital storage 34 during the input data portion of the buffer cycle. The incremented locations of the cursor which correspond to the past motion of pencil 50 on the display, can be used to display any given symbol, as for example dots or dots connected by lines during each subsequent display frame. By way of further illustration, assuming the initial cursor position is at the upper left, as viewed in FIG. 5, designated by numeral 120, the digital location corresponding to position 120 is entered into storage 34 and used to display a dot 122 at position 120 during subsequent display frames of the buffer cycle. When the cursor has been repositioned downwardly and to the right as viewed in FIG. 5 at a position 124, the digital location of this position will be entered into storage 34 and used to display dot 126 at position 124 during subsequent display frames. Similarly as the cursor is repositioned at successive locations 128, 130, 132, dots will be reproduced at these locations during subsequent display frames to display the past motion of pencil 50. In a computer operated display, storage 34 will be under the control of a computer (not shown) so that incremented locations of the cursor are entered in storage for subsequent display only if pencil 50 has been moved a minimum distance to justify displaying a new dot. Additionally when storage 34 is under the control of a computer, adjacent dots may be connected with lines to reproduce a continuous representation of the past motion of pencil 50.

The output from pencil 50 can also be used to designate a particular symbol other than the cursor for further action by a computer. During each display portion of the buffer cycle, counter 64 is incremented each time a symbol is displayed to store the number of that symbol as that symbol is displayed. When pencil 50 is placed over a symbol, the output from pencil 50 will be in time coincidence with one of the timing pulses from buffer 30 corresponding to the symbol over which the pencil is placed. This coincidence is noted by the sequence control 54 to disable the element number counter 64 and thus indicate the particular symbol over which the pencil has been placed. The symbol number may be transferred to the manual data input and used to specify a symbol or the location of the symbol that has been identified by the operator for further action by the computer. With appropriate manual input switches 36 and buffer operation this procedure may be used to designate a symbol for repositioning or electronic writing.

Although the method and apparatus have been described in connection with a square symbol, it will be apparent that any symbol having a unique X and Y configuration related to the display axes can provide an output which can be sampled at appropriate times during the generation of the symbol to provide an indication of the displacement between pencil 50 and the symbol. By way of further illustration, the error detector circuit shown in FIG. 2 could be used with other cursor symbol types having four strokes arranged in two pairs in the X and Y directions with the strokes in each pair being generally symmetrical about the center of the symbol. Such symbols include ovals and circles generated by four arcuate strokes in time sequence. Numerous other symbols have light distribution in opposite directions along the X and Y axes about the center of the symbol. By sampling selected strokes, the sampled output can be processed to sense any displacement betwen the light detector and the symbol to provide a correction signal directly related to the X and Y axes. The correction signal can then be used to increment the digital location signal of the symbol to coincide with the last known position of the detector. The invention disclosed herein may also be used to reposition any symbol on the display by overlying that symbol with the cursor and then moving the cursor with pencil 50. At the end of each frame the position of the cursor may be obtained from counters 42, 44 whereas the element number of the symbol over which the cursor has been overlaid is available from the element number counter 64. The element number and the incremented location of the cursor can be used to reposition the symbol selected by causing the symbol to move along with the cursor.

It will be understood that the data display system which is herein disclosed and described is presented for purposes of explanation and illustration and is not intended to indicate limits of the invention, the scope of which is defined by the following claims.

What is claimed is:

1. In combination a source of light, first means providing a pair of digital location signals, second means determining a physical location of said source in accordance with said digital location signals, said location and said signals being related to a pair of orthogonal axes, said light source comprising a plurality of strokes of light related to said axes, third means for generating said light strokes sequentially in response to an electrical signal, manually movable means disposable in front of said source and responsive to light from said source to provide an output, said output having time separated components each having a magnitude corresponding to the displacement between each of said strokes and said manually movable means, fourth means responsive to said electrical signal for sampling said output to separate said components, fifth means responsive to the relative magnitudes of said separated components to sense a displacement between said source and said manually movable means and provide a pair of error signals representing said displacement, said error signals being resolved along said axes, and sixth means responsive to said error signals for modifying said digital location signals to reposition said source.

2. In combination a source of light, first means providing a pair of digital location signals, second means determining a physical location of said source in accordance with said digital locaton signals, said location and said signals being related to a pair of orthogonal axes, said light source having a light distribution about a center of said source in opposite directions along said axes generated by a plurality of strokes of light, third means for generating said strokes sequentially in response to an electrical signal, manually movable means disposable in front of said source and responsive to light from said source to provide an output, said output having time separated components each having a magnitude corresponding to the displacement between each of said strokes and said manually movable means, fourth means responsive to said electrical signal for sampling said output to separate said components, fifth means responsive to the relative magnitude of said separated components to sense a displacement between said center and said manually movable means and provide a pair of error signals representing said displacement, and sixth means responsive to said error signals for modfiying said digital location signals to reposition said source.

3. In combination a source of light, first means providing a pair of digital location signals, second means determining a physical location of said source in accordance with said digital location signals, said location of said signals being related to a pair of orthogonal axes, said source comprising four strokes of light, a first two of said strokes being generally symmetrical about the center of said source along one of said axes, the other two strokes being generally symmetrical about the center of said source along the other of said axes, third means for generating said strokes sequentially in response to an electrical signal, manually movable means disposable in front of said source and responsive to light from said source to provide an output, said output having four time separated components each having a magnitude corresponding to the displacement between each of said strokes and said manually movable means, fourth means responsive to said electrical signal for sampling said output to separate said components, fifth means responsive to components representing said first two strokes for measuring the relative magnitudes between said components to sense a first displacement between said center and said manually movable means along said one axis and provide a first error signal representing said displacement, sixth means responsive to said components for measuring the relative magnitudes between said components to sense a second displacement between said center and said manually movable means along said other axis and provide a second error signal representing said second displacement, and seventh means responsive to said error signals for modifying said digital location signals to reposition said source.

4. In a data processing system, a luminous display, first means storing digital location data for displaying a plurality of items, second means operatively connected to said display and said first means for causing said items to be displayed in time sequence, said second means including third means for generating one of said items in a plurality of strokes, fourth means providing electrical signals in time coincidence with each of said strokes, fifth means for identifying digital location data for said one item in time coincidence with the display of that item, aimable means disposable in front of said display for identifying a location on said display closely adjacent said one item and responsive to the display of said one item to provide an output signal having time separated components each having a magnitude corresponding to the displacement between each stroke and said aimable means, sixth means responsive to said electrical signal for sampling said output signal to separate said components, seventh means responsive to said separated components for measuring the relative magnitudes between said components to sense a displacement between said one item and said aimable means and provide an error signal representative of a displacement between said one item on said display and said adjacent location of said aimable means, and eighth means operatively connected to said fifth and seventh means responsive to said error signal for correcting the digital location data of said one item to correspond to the display location of said aimable means.

5. In a data processing system, a luminous display having orthogonal axes, first means storing digital location data for displaying a plurality of items, second means operatively connected to said display and said first means for causing said items to be displayed in time sequence, said second means including third means for generating one of said items in a plurality of sequential strokes distributed about a center of said one item in opposite directions along said axes, fourth means providing an electrical signal in time coincidence with each of said strokes, fifth means for identifying digital location data for said one item in time coincidence with the display of that item, aimable means disposable in front of said display for identifiying a location on said display closely adjacent said one item and responsive to the display of said one item to provide an output signal having time separated components each having a magnitude corresponding to the displacement between each stroke and said adjacent location of said aimable means, sixth means responsive to said e'ectrical signal for sampling said output signal to separate said components, seventh means responsive to said separated components for measuring the relative magnitudes between said components to sense a displacement between said one item and said aimable means and provide an error signal representative of a displacement between said one item on said display and said adjacent location of said aimable means, and eighth means operatively connected to said fifth and seventh means and responsive to said error signal for correcting the digital location data of said one item to correspond to the display location of said aimable means.

6. In a data processing system, a luminous display having orthogonal axes, first means storing digital location data for displaying a plurality of items, second means operatively connected to said display and said first means for causing said items to be displayed in time sequence, said second means including third means for generating one of said items in sequential strokes, a first pair of said strokes being generally symmetrical about a center of said one item along one of said axes, a second pair of said strokes being generally symmetrical about said center along the other of said axes, fourth means providing an electrical signal in time coincidence with each of said strokes, fifth means for identifying digital location data for said one item in time coincidence with the display of that item, aimable means disposable in front of said display for identifying a location on said display closely adjacent said one item and responsive to the display of said one item to provide an output signal having time separated components each having a magnitude corresponding to the displacement between each of said strokes, and said aimable means, sixth means responsive to said electrical signal for sampling said output signal to separate said components, seventh means responsive to the relative magnitudes of components representing said first pair of strokes to sense a first displacement between said center and said aimable means along said one axis and provide a first error signal representing said first displacement, eighth means responsive to the relative magnitudes of components representing the second pair of strokes to sense a second displacement between said center and said aimable means along said other axis and provide a second error signal representing said second displacement, and ninth means operatively connected to said fifth means and responsive to said error signals for correcting the digital location data of said one item to correspond to the display location of said aimable means.

7. In a data processing system having a luminous visual display composed of successive frames, each of said frames displaying a plurality of items successively in time sequence at display locations specified by digital data, and said digital data having components related to orthogonal axes of said display, means for moving one of said items from a first location on said display to a second location on said display comprising light detector means disposable in front of said display and movable to successive intermediate positions between said first location and said second location, said one item having a plurality of light strokes generated sequentially in response to electrlcai signals, said strokes being distributed about a center of said one item in opposite directions along said axes, said detector means being responsive to light from said one item when said detector means is disposed at one of said positions adjacent said one item to provide an output having time separated components each having a magnitude corresponding to the displacement between each of said strokes and the position of said detector means responsive to said electrical signals for sampling said output to separate said components, and means for comparing the magnitudes of selected components to sense a displacement error between the position of said detector means and said center and provide a displacement error signal during one of said frames, and means responsive to said errror signal for correcting said digital components of said one item to reposition said one item at said adjacent position during a subsequent frame.

8. In a data processing system which includes storage of digital location data for displaying a plurality of items, means generating a luminous visual display of said items successively in time sequence at locations on said display specified by said digital location data, said data including a pair of digital location components for each item representing respective locations on a pair of orthogonal axes of said display, and means for moving a selected one of said items from a first display location to a second display location, said one item having four light strokes generated sequentially in response to electrical signals, a first pair of said strokes being generally symmetrical about a center of said one item along one of said axes, a second pair of strokes being generally symmetrical about said center along the other of said axes, said means for moving said one item comprising a manually movable light detector disposable in front of said display over said first location and responsive to light from said four strokes of said one item to provide an output having four time separated components each having a magnitude corresponding to the displacement between each of said strokes and said light detector, four sampling means operatively connected to said light detector and responsive to said electrical signals to separate said components, a pair of differential amplifiers, one of said amplifiers being responsive to the relative magnitudes of components representing said first pair of strokes to sense a first displacement between said center and said light detector along said one axis and provide a first analog signal representing said first displacement, the other of said amplifiers being responsive to the relative magnitudes of components representing the second pair of strokes to sense a second displacement between said center and said light detector along said other axis and provide an analog signal representing said second displacement, a first analog to digital converter operatively connected to said one amplifier and responsive to one of said first analog signals to provide a first digital signal representing said first displacement, a second analog to digital converter operatively connected to said other amplifier and responsive to said second analog signal to provide a second digital signal representing said second displacement, a first counter identifying the digital location component for said one item along said one axis while said one item is displayed, a second counter identifying the display location component along said other axis for said one item while said one item is displayed, first means operatively coupled between said first converter and said first counter to increment the digital location component in said first counter in accordance with said first digital signal, and second means operatively coupled between said second converter and said second counter to increment the digital location component in said second counter in accordance with said second digital signal, said first and second means being operative when an output from said light detector for said one item is substantially coincident with the generation of the display of that item.

References Cited

UNITED STATES PATENTS

| | | | |
|---|---|---|---|
| 3,089,918 | 5/1963 | Graham | 340—324.1 |
| 3,337,860 | 8/1967 | O'Hara | 340—324.1 |

JOHN W. CALDWELL, *Primary Examiner.*

A. J. KASPER, *Assistant Examiner.*